United States Patent [19]
Tafel

[11] 4,009,827
[45] Mar. 1, 1977

[54] FLEXIBLE, RESILIENT, AND WEAR RESISTANT RAILROAD CROSSING STRUCTURE

[76] Inventor: Leonard I. Tafel, 6345 N. Tripp, Chicago, Ill. 60646

[22] Filed: June 12, 1975

[21] Appl. No.: 586,239

[52] U.S. Cl. ............................................ 238/8
[51] Int. Cl.² ...................................... E01C 9/04
[58] Field of Search .............. 238/8, 9; 404/32, 33, 404/34, 35; 15/215, 216

[56] References Cited
UNITED STATES PATENTS

| | | | |
|---|---|---|---|
| 1,191,561 | 7/1916 | Burns | 238/8 |
| 1,562,147 | 11/1925 | Campbell | 238/8 |
| 2,256,025 | 9/1941 | Hoak | 238/8 |
| 2,327,624 | 8/1943 | Denman | 15/215 X |
| 2,496,739 | 2/1950 | Montgomery | 238/8 |
| 2,828,079 | 3/1958 | Rennels | 238/8 |
| 3,843,051 | 10/1974 | Whitlock | 238/8 |
| 3,866,830 | 2/1975 | Hein et al. | 238/8 |
| 3,894,686 | 7/1975 | Weinberg et al. | 238/8 |

*Primary Examiner*—L. J. Paperner
*Assistant Examiner*—Randolph A. Reese
*Attorney, Agent, or Firm*—Laff, Whitesel & Rockman

[57] ABSTRACT

The crossing structure is used at an intersection of a roadway, railroad right-of-way to provide an inexpensive and durable and smooth surface covering for that portion of the roadway which is between the tracks and immediately adjacent the tracks, on either side thereof. The structure is made from a rubber laminae clamped between metal plates which interlock between the rails. Preferably, the laminae is made from bodies of used automobile tires.

15 Claims, 4 Drawing Figures

FLEXIBLE, RESILIENT, AND WEAR RESISTANT RAILROAD CROSSING STRUCTURE

This invention relates to flexible, resilient, and wear resistant railroad crossing structures which present a continuous, and smooth surface that does not deteriorate quickly under normal usage or weather.

A background of knowledge in the art of constructing railroad crossings and of making laminae constructions may be obtained from a study of the following U.S. Pat. Nos.:

| Arthur | 725,914 |
|---|---|
| Denman | 2,327,624 |
| Lanier | 2,652,981 |
| Rennels | 2,828,079 |
| Rennels | 2,828,080 |
| Caillet | 3,465,963 |
| Whitlock | 3,843,051 |
| Hein | 3,866,830 |

Usually, railroad crossings are rough and bumpy, uncomfortable to ride over and to damage autos, tires, and the like. As a generality, the railroad crossings become rougher and deteriorate quickly with use and as a result of exposure to weather.

A number of different materials have been used in an effort to provide smoother crossings and to resist erosion responsive to weather conditions. However, each of these materials have tended to create problems. Sometimes the cost of installation was substantial. Sometimes the roadway and railroad sunk under weight or heaved under frost. Sometimes oil, gasoline, or other of the contaminates produced by society damaged the crossing surface.

Other problems which have plagued modern society is both the disposal of its own rubbish and an over-consumption of resources. The usual procedure is to burn, bury or otherwise waste and destroy the resources represented by such rubbish. This wanton waste of resources is currently exciting great concern since the earth is essentially a system of limited raw materials which cannot be replaced, as they are depleted. Accordingly, it is desirable to simultaneously provide new and improved railroad crossings, and to reuse material which was heretofore discarded as waste.

Accordingly, an object of the present invention to provide new, improved, economical, and durable roadway approaching and crossing for railroad tracks. Another object is to improve the comfort of one travelling the streets in the areas where streets intersect railroad tracks and where, large irregularities in the roadway occur within a comparatively short time after paving or repairing is done, especially at heavily travelled intersections. In northerly latitudes, an object is to retard destruction of crossings accelerated by the action of freezing and thawing.

A further object is to provide methods of crossing construction wherein there is a minimum chance of pieces of the crossing material becoming dislodged and causing derailment, such as may occur with the use of concrete or wood, steel or the like.

A further object in these times of material shortage is to utilize a recycled or previously used material without sacrifice of durability or utility.

The nature of a preferred embodiment may become more apparent from a study of the attached drawing, wherein.

Figure 1:
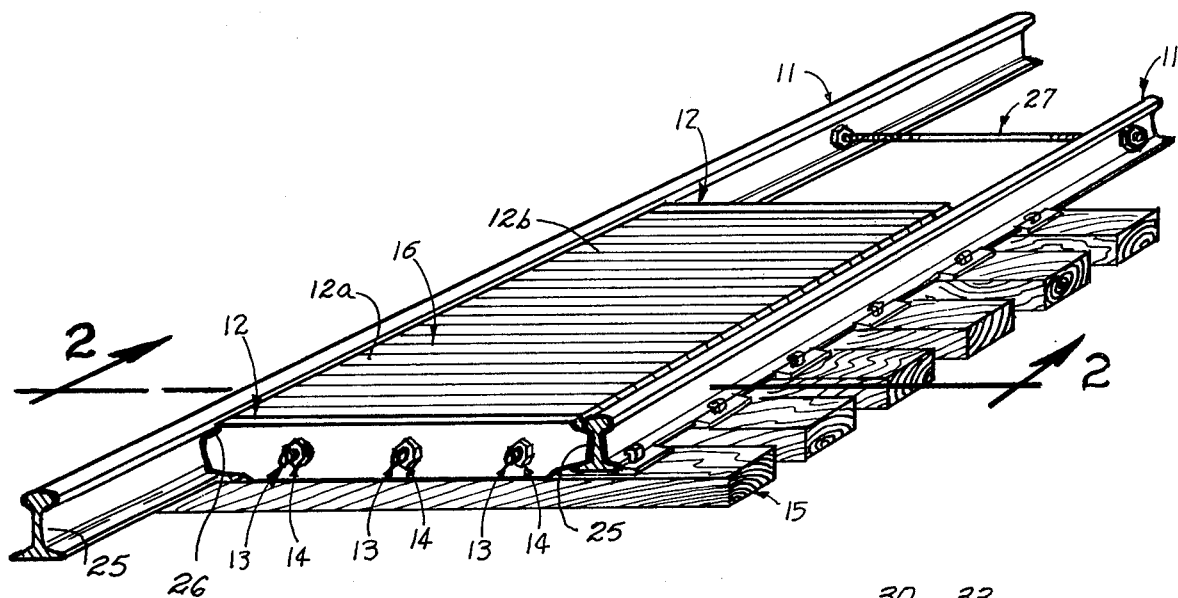
FIG. 1 is a perspective view of the inventive crossing in conjunction with a standard railroad track having a pair of parallel rails with their crossties, etc.

While the invention is susceptible of various modifications and alternate forms, a specific embodiment thereof has been shown by way of example in the drawing and will herein be described in detail. It should be understood, however, that it is not intended to limit the invention to the particular form disclosed but, on the contrary, the invention is to cover all modifications, equivalents and alternatives falling within the spirit and scope of the invention.

Turning now to the drawings, there is shown in FIG. 1 an illustrative crossing assembly embodying the present invention. The assembly includes a pair of rails 11 mounted on conventional railroad ties 15. A pair of end plates 12 fit between and in abutment with the webs 25 of the rails, and with notched sections fitting over and under the bottom and top flanges of the rails. It should be noted from the drawing that the notches 26 form grooves giving clearance for the flanges of railroad wheels to pass over the crossing. The end plates 12 are held together with tie rods 13 and nuts 14. These end plates serve as clamps to contain the laminae 16. Each laminate strip has a number of holes which are threaded over the tie rods 13. Any suitable number of rigid plates, interlocking the rails in a manner similar to the end plates 12, may be positioned at various intervals between the laminae to further strengthen the assembly.

The material of the laminae is preferably composed of, but not limited to, sections cut from the tread area of discarded pneumatic automobile and similar tires. Thus, the sidewalls are cut away, leaving a ring of synthetic rubber vulcanized to cords, which is an extremely durable and inexpensive material. This ring is then cut and flattened to form a strip from which the appropriate cross section laminae may be stamped-out. If additional resistance to movement of the assembly is desired, those laminae which are not situated above a tie 15 may have a tab which is extended downwardly between the ties, thus locking the assembly in position; however, this embodiment with tabs precludes skewing the assembly for installation, as described below.

To facilitate on-site installation, the nuts 14 may be welded onto the threaded rods 13 at one end only. The assembly of end plates, tie rods and laminae is preferably made up in whole or part in a shop. By skewing the assembly, with the nuts 14 loosened on each rod 13, the entire assembly may be placed into position between the rails. The skewed laminae and end plates 12 are then forced into a transverse position which is perpendicular to the rails, as shown in FIG. 1, after which the nuts 14 are tightened. As the nuts 14 are tightened and the plates 12, 12 are squeezed toward each other, there is a slight expansion in the resilient laminae, thus securing the entire assembly into position by friction between the laminae and rails. If additional strengthening seems necessary, standard railroad tie bars 27 may be used at the ends, middle, or elsewhere in the crossing laminae to maintain an accurate spacing of the rails and to prevent movement of the crossing assembly.

Figure 3:
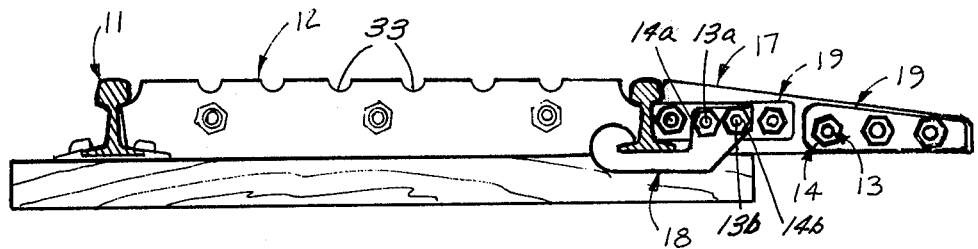
FIG. 3 is a transverse view showing an embodiment of this invention using an approach ramp at the track crossing.

The principles herein taught may also be applied on the track crossing approaches as shown in FIG. 3. The principal difference between the main crossing laminae 16 and the secondary approach laminae 17 is that the secondary approach laminae 17 is tapered, is clamped to the rail, and is at least partially supported by a bracket 18 and the rails, on one end only. The other end of approach laminae 17 is clamped together by threaded rod passing through special end plates 19 and supported by the roadway, railway ballast, or any other suitable means, or, as in the use of filler blocks between pairs of rails, by one of the rails of the adjacent tracks.

As one can plainly see in FIG. 3, the clamp 18 is an arm having a C-shaped clamp on one end and a pair of bolt holes on the other end. This arm provides means for attaching the secondary tapered laminae 17 to a rail. First, the arm is placed under a rail, the C-shaped end fits over and holds the flange at the bottom of the rail. The bolt holes are fitted over the ends of threaded rods 13a, 13b and then the nuts 14a, 14b are attached and tightened into position. This arrangement keeps the tapered approach 17 from migrating away from the rail. The clamp 18 will help support the secondary laminae 17. Noted that most of the vertical loading acting upon the outer end of the taper of the approach 17 is carried by the underlying surface which may be railroad track ballast, a highway pavement, the earth, or the like. The weight on the inner end of the tapered laminae is carried by the rail, and particularly by the lower flange of the rail.

A purpose of this approach 17 is to provide a flexible connection between the relatively rigid roadway and the tracks, which move under the action of the train wheels. A further purpose of this approach is to provide an easily removed section for giving railroad maintenance crews access to the ties, spikes, electric wire, pipes, etc. without destruction of part of the roadway, with attendant costs and service interruptions. In addition to end plates, laminae, and rods, extra plates 12a, 12b, . . . may be interposed, if desired, at intervals between the laminae to provide additional rigidity and strength.

While the invention has been described with particular reference to a roadway filler for the spaces between railroad rails, it will be appreciated that the principles herein taught may be used to provide a durable roadway wherever there is extraordinary stress, environmental factors or a need for an occasional access to the space beneath the roadway surface. It will also be appreciated by those skilled in the art that bonding, vulcanizing, etc. may be used to hold the laminae and end plates together as a unit in place of or in addition to the tie rods, although bonding or vulcanizing alone will result in some loss in rigidity.

Figure 4:
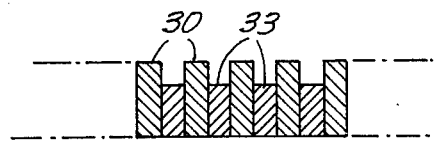
FIG. 4 shows a way of constructing the crossing to improve traction and facilitate drainage.
Figure 2:
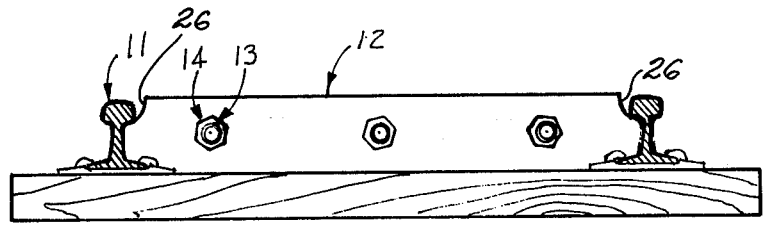
FIG. 2 is a transverse section taken in the plane of line 2—2 of FIG. 1.

The upper surface of laminate 16 is preferably cut with a grooved, corrugated, or roughened cut (as at 33) so as to provide better traction for vehicles. Grooves 33 may also be cut to allow drainage and aeration of the laminate substance. The laminae (FIG. 4) may also have regular width laminae intersperced with shorter width laminate sections 32, in staggered positions in alternate rows, so that when clamped the laminae have a somewhat sinuous surface shape, in plane view. It will be appreciated that the laminae may be replaced by a single block of resilient material in the various embodiments.

I claim as my invention:

1. A flexible and resilient crossing structure for extending a roadway across a railroad track, said structure comprising a continuous surface formed by the edges of a laminae of elongated, flexible and resilient strips secured together in a face-to-face, vertical relationship with rigid plates terminating opposite ends of said laminae, said laminae having a length equal to the width of a desired roadway, and a width equal to the space between the vertical webs of a pair of railroad rails, each strip in said laminae having longitudinal notches along at least some corners thereof so that said laminae fits snuggly between and is supported by said rails and the laminae surface is substantially flush with the tops of said rails, said laminae being free of attachment to the underlying railroad bed.

2. The structure of claim 1 wherein a plurality of said rigid plates are intersperced within said laminae for transferring the load of any weight resting upon the laminae to the rails.

3. The structure of claim 1 wherein each strip of said laminae is cut from a body of an automobile tire, and the elongated axes of said strips in said laminae are perpendicular to rails of said railroad tracks.

4. The structure of claim 3 wherein some of said strips are wider than other of said strips, with strips of different widths being interspersed with each other so that the surface of said laminae tends to have a sinuous contour, thereby improving both traction and drainage.

5. The structure of claim 3 and means for drawing together said terminal plates to compress said strips therebetween whereby the ends of said laminae strips are squeezed outwardly, thereby tending to wedge said laminae with a friction fit between said rails.

6. The structure of claim 5 wherein said means for drawing together said terminal plates comprise a plurality of elongated bolts which are threaded on at least one end thereof, said bolts passing through aligned holes in each of said strips and plates, whereby a tightening of nuts on said threaded ends compress said strips between said plates.

7. The structure of claim 3 wherein each of said strips has an end contour substantially conforming to the cross sectional contour of a rail, with a clearance notch in each strip adjacent each rail for forming a groove to enable a flange of a railroad wheel to pass over said structure, whereby the ends of each strip are pressed against the web of the rail so that the laminate interlocks into the rail cross section, and rests upon the lower flange of the rail.

8. The structure of claim 7 wherein each of said end plates also has an end contour substantially conforming to the cross sectional contour of a rail with a clearance notch for enabling a flange of a railroad wheel to pass thereover.

9. The structure of claim 1 and secondary laminae means on at least one side of said pair of rails to provide an approach surface leading to said crossing, and means for clamping said secondary laminae to the rail on said one side.

10. The structure of claim 9 wherein said secondary laminae clamping means comprises an arm having a generally C-shaped clamp on one end and means on the other end for attaching the arm to said secondary laminae, said arm reaching under a rail with said C-shaped clamp attached to the lower flange on said rail.

11. The structure of claim 10 wherein said secondary laminae has a tapered cross section and said strips are perpendicular to said rails.

12. The structure of claim 1 and contour means cut into the surface of said laminae for enabling drainage and improved traction.

13. A flexible railroad crossing structure for extending auto roadways over at least one railroad track, said structure comprising a plurality of elongated strips cut from automobile tire bodies, said plurality of strips being shaped to stand vertically side-by-side between and perpendicular to a pair of rails, the opposite ends of said strips being contoured to make close contact with the inside vertical cross section perimeter contours on a pair of rails forming a track with a clearance space in the area traversed by a railroad wheel flange, said laminae being free of attachment to the underlying railroad bed and being supported by the rails, and means for tightly clamping together said strips so that upper edges of said strips form the roadway surface.

14. The structure of claim 13 and rigid plates interspersed with said flexible strips, and means whereby substantially the entire weight of the structure is supported by and between a pair of rails forming a track.

15. The structure of claim 13 and tie means extending between said pair of rails to preclude a separation of said rails from said laminae, whereby said laminae is supported in large part by said rails.

* * * * *